United States Patent [19]

Fauchald

[11] Patent Number: 5,285,938
[45] Date of Patent: Feb. 15, 1994

[54] HOLDER FOR A MOBILE TELEPHONE
[76] Inventor: Willy Fauchald, Baneveien 34, N-2322 Ridabu, Norway
[21] Appl. No.: 852,197
[22] PCT Filed: Dec. 4, 1990
[86] PCT No.: PCT/NO90/00181
    § 371 Date: Jun. 3, 1992
    § 102(e) Date: Jun. 3, 1992
[87] PCT Pub. No.: WO91/08126
    PCT Pub. Date: Jun. 13, 1991
[30] Foreign Application Priority Data
    Dec. 4, 1989 [NO] Norway .................. 894829
[51] Int. Cl.⁵ .............................................. B60R 11/02
[52] U.S. Cl. ........................... 224/42.45 R; 248/279
[58] Field of Search ................. 224/282, 42.45 R; 248/278, 279, 215, 309.1; 379/455, 454, 449

[56] References Cited

U.S. PATENT DOCUMENTS

| | | | |
|---|---|---|---|
| 1,618,985 | 3/1927 | Kelly et al. | 248/279 |
| 2,914,829 | 12/1959 | Willemain | 248/279 |
| 4,319,097 | 3/1982 | Liautaud | 179/146 R |
| 4,472,606 | 9/1984 | Krolopp et al. | 179/146 R |
| 4,617,430 | 10/1986 | Bryant | 179/146 R |
| 4,984,722 | 1/1991 | Moore | 224/42.45 R |
| 5,040,712 | 8/1991 | Pesonen et al. | 224/42.45 R |
| 5,060,260 | 10/1991 | O'Connell | 379/454 |
| 5,082,235 | 1/1992 | Crowther et al. | 248/278 |
| 5,086,958 | 2/1992 | Nagy | 224/42.45 R |

FOREIGN PATENT DOCUMENTS 3507016 8/1986 Fed. Rep. of Germany .
300698 12/1988 Japan .................. 379/455

Primary Examiner—Renee S. Luebke
Attorney, Agent, or Firm—Jacobson, Price, Holman & Stern

[57] ABSTRACT

A holder (1) for a mobile telephone (3), which is intended for being mounted in a car has a holder (29), which surrounds and firmly holds the telephone. A fastening member (5) is intended for fastening the holder to the interior of the car. The fastening member (5) is angular and the holder is, via a universal joint (21), fastened to a first angle leg (10) of the fastening memeber (5). The other angle leg (6) is intended for being pressed into the slot between the glass pane and frame of the front door of the car which is closest to the driver.

2 Claims, 1 Drawing Sheet

HOLDER FOR A MOBILE TELEPHONE

BACKGROUND OF THE INVENTION

The present invention relates to a holder for a mobile telephone intended for being mounted in a car, craft or another means of conveyance, comprising a holder portion which is adapted to one end of the mobile telephone to surround and firmly hold the latter, and a fastening portion for fastening the holder to the interior of the car.

Use of mobile telephones is steadily growing. The fact that mobile telephone instruments are getting progressively smaller and better as well as less expensive contributes to this. The largest group of users is comprised of sales representatives, fitters, inspectors and other occupational groups who do a large amount of travelling. This requires a mobile telephone to be mounted in the car. It is an obvious requirement that the telephone instrument should be accessible as readily as possible in the car. Previously, this was not the case. Until now it was most common to fasten the mobile telephone instrument on the dashboard between the front seats, or on the central console between the front seats. This is a most unsuitable position for the telephone instrument, since it requires use of the right hand to grip the instrument. This will cause reduction of road safety, and many accidents are caused by uncontrolled maneuvering by the car driver when servicing the telephone, since it is necessary to let go of the steering wheel with ones right hand and lean over to the side. What happens in practice is that one takes the telephone instrument with one's right hand and very often changes it over to one's left hand to carry on the conversation. This implies that one must in fact let go of the steering wheel with both hands for a moment. When the conversation is ended and the instrument is to be put in place again the same maneuver has to be repeated in the opposite sequence. Lately, some producers delivered so called "handfree" telephone instruments, meaning that the instrument may stay in place in its holder while a conversation is in progress. Still, however, one has to press down a key on the telephone, both to start and to finish the conversation. What appears to be most hazardous to traffic when a mobile telephone is used, is to dial a number consisting of many figures, and this is as hazardous with the last mentioned kinds of telephones and with the above described manner of mounting.

Summary of the Invention

It is an object of the present invention to provide a holder for a mobile telephone instrument, which may be mounted on the front door of a vehicle which is closest to the driver, i.e. generally the front door on the left hand side, and which is designed to be adjustable in such a manner that the distance and the angle between instrument and driver is suitable, and that the holder may be mounted in such a manner that no interference with the interior of the car, e.g. by drilling holes or the like, is required.

According to the invention this is achieved by the aid of a holder of the above mentioned kind which has a fastening member in the form of an angled plate with one limb adapted to fit in the slot between the window pane of the driver's side door and the door jams.

By the aid of the holder according to the invention simple mounting is achieved, the limb of the angled plate on the fastening member is pressed down into the slot between the window pane and the interior portion of the window frame in the front driver's side door on the left hand side of the car. By the aid of a universal joint and mutually adjustable portions of the holder, the distance and angle of the holder relative to the driver may be adjusted, so that the instrument may be operated by one finger without any need of letting go of the steering wheel. If it is desired to have a conversation with the receiver out of its holder, one takes the instrument out of its holder with one's left hand and replaces it with the same hand when the conversation is ended. In this manner one can avoid changing over the instrument from one hand to the other and the entire operation may occur without one having to look away from the road, possibly apart from a short moment. If one must glance at the telephone instrument for a moment, this will not interfere much more with one's concentration than when checking the speed or other information on the dashboard. The angle between the direction of driving and the telephone when it is correctly mounted on the left hand side will only be approximately one third as compared to the case of a telephone mounted on the right hand side.

Mutually independent experiments with the holder show that in order to receive a call and then use "handfree" operation, it is not at all necessary to look away from the road, since one knows where the key is situated relative to the steering wheel, e.g. in the same manner as one operates the flasher handle without glancing at it.

The holder may be mounted within a few minutes and may readily be moved to another car or, if desired, to the opposite side. It is, thus, of no concern whether the car has its steering wheel on the right hand side or the left hand side.

BRIEF DESCRIPTION OF THE DRAWINGS

The invention will be disclosed in more detail below with reference to the drawing, which shows an embodiment of the holder according to the invention.

DESCRIPTION OF PREFERRED EMBODIMENT

Figure 1:
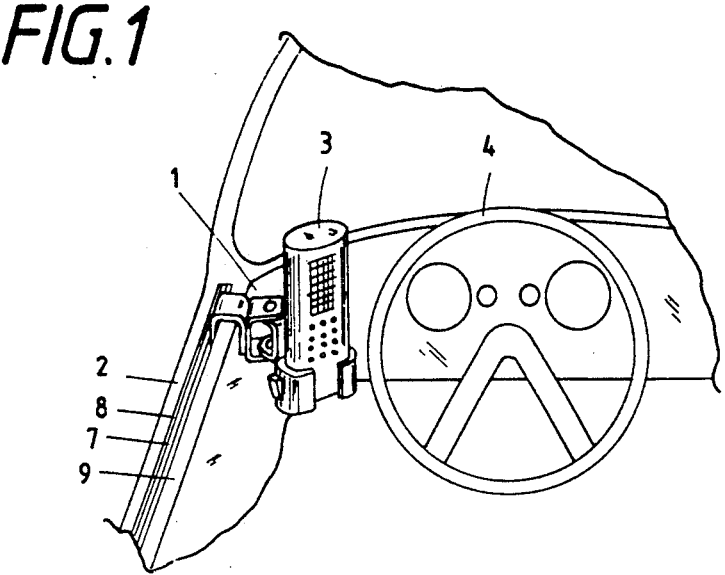
FIG. 1 is a diamgrammatical perspective view of the inventive holder fitted in a car on the front door on the left hand side.
Figure 2:
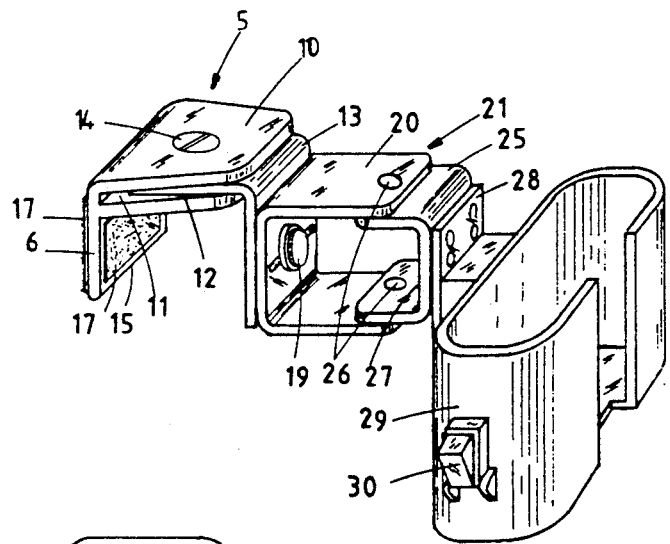
FIG. 2 shows the holder according to the invention in perspective.
Figure 3:
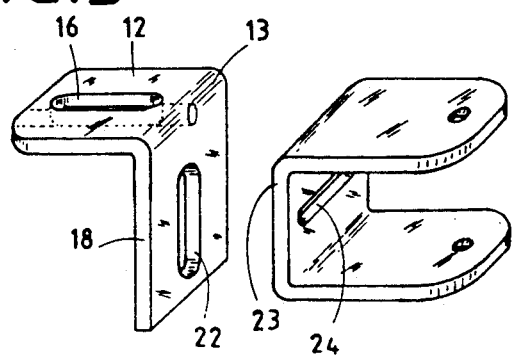
FIG. 3 shows two cooperating part of the holder also in perspective.

The holder which is generally designated by numeral 1 is in FIG. 1 fastened to the front door 2 on the left hand side of the car in such a manner that the telephone instrument 3 is placed close to the steering wheel 4, so that the telephone may in practice be operated by one finger of the driver's left hand, at the same time as this hand rests on the steering wheel.

The holder consists of a U-shaped bracket means formed from an angular fastening member 5, and a second angular member 13 with one leg or limb 6 of the angular member being intended for insertion in the slot 7 between the window pane 8 and the internal portion of frame 9 of front door 2. The other leg 10 of the fastening member 5 is bifurcated, so that a slot 11 is formed into which one leg 12 of angular member 13 is inserted. Members 5 and 13 are fastened to each other by the aid of a through bolt 14 in such a manner that angular adjustment of angular member 13 is possible. Fastening member 5 and angular member 13 are assembled to form an upside-down U with opening 15 facing downwards. In leg 12 of the angular member, which engages slot 11 of the fastening member 5, a slot 16 is made to permit adjustment of the width of opening 15. In this way the holder may be adapted to the width of door frame 9 of various car makes. When mounted members 5 and 13 are pressed together before bolt 14 is tightened, so that a firm hold is achieved about frame member 9. Angle leg 6 is on both sides covered with a soft, e.g. velvety material 17.

By the aid of a bolt 19 a U-shaped member 20 of a universal joint assembly 21 is fastened to the other leg 18 of angular member 13. A vertical slot 22 is made in leg 18, and in web 23 of member 20 a horizontal slot 24 is made. Bolt 19 extends through said slots and when the nut of this bolt is loosened U-shaped member 20 may be adjusted both in a vertical and a horizontal direction. Inside U-shaped member 20 another U-shaped member 25 engages. The legs of U-shaped member 25 are fastened to the legs of U-shaped member 20 by the aid of pivots 26. Members 20 and 25 are secured to each other in such a manner that a certain friction is provided between them to prevent unintentional mutual displacement of these two members. Via a plate 28 a standard holder means 29 for a telephone instrument 3 is fastened to webs 25 and 27 of said members. A snap device 30 ensures that the instrument is safely held by the holder means.

The invention has been described in connection with the front door of a car. The holder may, however, obviously be attached to any door of a car, if other persons than the driver are to use the telephone. The holder may also be used in other means of conveyance.

I claim:

1. A holder for mounting a mobile telephone in a car or other vehicle comprising a U-shaped bracket means formed from first and second interconnected angular members, the bracket means having a first vertical limb to be pressed into a slot between a window pane and an inner, lower portion of a door frame of the car or other vehicle, a second vertical limb, and a first connector means between the angular members, said first connector means providing distance adjustment between the first and second vertical limbs to suit door frames of varying widths, the holder further comprising a universal joint assembly connected to the bracket means and a telephone holder means connected to the universal joint assembly, wherein the universal joint assembly comprises first and second pivotally interconnected U-shaped members, each U-shaped member having a base and opposed limbs extending from said base, wherein the base of the first U-shaped member is connected to said second vertical limb of the bracket means by second connector means including vertical and horizontal slots in said base and said second vertical limb and a fastener pivotally attaching the base to said second vertical limb through said slots whereby said slots provide vertical and horizontal adjustment of said universal joint assembly relative to said bracket means, wherein the limbs of the second U-shaped member are pivotally connected to the limbs of the first U-shaped member and wherein the telephone holder means is connected to the base of the second U-shaped member.

2. A holder as claimed in claim 1, wherein the first and second angular members have respective horizontal limbs interconnected by said first connector means, and wherein said first connector means includes a pivot and slot connection between said horizontal limbs.

* * * * *